(12) United States Patent
Le et al.

(10) Patent No.: US 12,482,588 B2
(45) Date of Patent: Nov. 25, 2025

(54) NITROGEN DOPED OXIDES FOR LOWER BANDGAP

(71) Applicant: Western Digital Technologies, Inc., San Jose, CA (US)

(72) Inventors: Quang Le, San Jose, CA (US); Brian R. York, San Jose, CA (US); Andrew Chen, San Jose, CA (US); Jinming Liu, San Jose, CA (US); Alan Spool, San Jose, CA (US); Son T. Le, San Jose, CA (US); Xiaoyong Liu, San Jose, CA (US); Michael A Gribelyuk, San Jose, CA (US); Hisashi Takano, Fujisawa (JP); Xing-Cai Guo, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/407,553

(22) Filed: Jan. 9, 2024

(65) Prior Publication Data
US 2025/0226140 A1 Jul. 10, 2025

(51) Int. Cl.
| | | |
|---|---|---|
| G11B 5/31 | (2006.01) | |
| G11B 5/39 | (2006.01) | |
| H01F 10/32 | (2006.01) | |
| H10N 50/20 | (2023.01) | |
| G11B 5/00 | (2006.01) | |

(52) U.S. Cl.
CPC ......... *H01F 10/3254* (2013.01); *G11B 5/314* (2013.01); *G11B 5/3912* (2013.01); *H01F 10/329* (2013.01); *H10N 50/20* (2023.02); *G11B 2005/0024* (2013.01)

(58) Field of Classification Search
None
See application file for complete search history.

(56) References Cited

U.S. PATENT DOCUMENTS

| | | | |
|---|---|---|---|
| 7,252,852 B1 | 8/2007 | Parkin | |
| 9,099,124 B1 * | 8/2015 | Freitag | ................ G01R 33/098 |
| 9,672,854 B2 | 6/2017 | Kubota et al. | |
| 10,522,746 B1 | 12/2019 | Sundar et al. | |
| 11,152,020 B1 * | 10/2021 | Gong | .................. G11B 5/3163 |
| 11,217,289 B1 * | 1/2022 | Prasad | ................... H10N 50/01 |
| 11,355,694 B2 | 6/2022 | Daibou et al. | |

(Continued)

OTHER PUBLICATIONS

International Search Report and Written Opinion for Application No. PCT/US2025/010007 dated May 4, 2025.

*Primary Examiner* — William J Klimowicz
(74) *Attorney, Agent, or Firm* — Patterson + Sheridan, LLP (57) ABSTRACT

Nitrogen doping an insulating layer can lower the bandgap of a magnetic storage device. It is challenging to nitrogen dope magnesium oxide (MgO). A cation can be added to allow the magnesium to hold onto the nitrogen dopant without highly oxidizing or nitriding the cation. The resulting nitrogen doped MgXO, where X is the cation, has a lower bandgap compared to a much similar barrier layer that has neither nitrogen nor a cation thus improving thermal and electrical reliabilities. The nitrogen doped MgXO is non-stoichiometric whereas comparably, an oxynitride is stoichiometric. Example cations that may be used include aluminum, titanium, vanadium, chromium, and scandium.

19 Claims, 6 Drawing Sheets

(56) References Cited

U.S. PATENT DOCUMENTS

| | | | |
|---|---|---|---|
| 2007/0053113 A1* | 3/2007 | Papworth Parkin | H01F 10/3254 |
| | | | 257/E43.006 |
| 2008/0164547 A1* | 7/2008 | Higo | H10N 50/85 |
| | | | 257/E27.005 |
| 2009/0067232 A1* | 3/2009 | Korenivski | G11C 11/161 |
| | | | 365/171 |
| 2009/0154029 A1* | 6/2009 | Iwasaki | G01R 33/093 |
| 2011/0033718 A1* | 2/2011 | Nakahara | C30B 29/16 |
| | | | 428/697 |
| 2011/0140762 A1* | 6/2011 | Jiang | H10N 70/043 |
| | | | 327/365 |
| 2012/0231243 A1* | 9/2012 | Watanabe | C04B 35/581 |
| | | | 428/697 |
| 2016/0260890 A1 | 9/2016 | Guo | |
| 2018/0358547 A1* | 12/2018 | Yang | H10B 61/10 |
| 2019/0109277 A1* | 4/2019 | Jan | H10N 50/10 |
| 2020/0227628 A1* | 7/2020 | Wang | G11C 11/16 |
| 2021/0056988 A1 | 2/2021 | Chen et al. | |
| 2021/0134882 A1* | 5/2021 | Lin | H10B 61/22 |
| 2022/0139422 A1 | 5/2022 | Ho et al. | |
| 2023/0047223 A1 | 2/2023 | Le et al. | |
| 2023/0084970 A1* | 3/2023 | Okamura | H10N 50/10 |
| | | | 257/421 |
| 2024/0005973 A1 | 1/2024 | Le et al. | |

* cited by examiner

NITROGEN DOPED OXIDES FOR LOWER BANDGAP

BACKGROUND OF THE DISCLOSURE

Field of the Disclosure

Embodiments of the present disclosure generally relate to lowering the bandgap of insulating layers in magnetic storage devices.

Description of the Related Art

Magnetic recording heads oftentimes utilize an insulating material to electrically insulate conductive layers from one another. In a tunneling magnetoresistance (TMR) device, also called a magnetic tunneling junction (MTJ) device, the insulating layer is used as a barrier layer between two ferromagnetic layers to create a tunneling barrier layer.

The insulating layer is typically made of a metallic oxide. While various metallic oxides, such as alumina ($Al_2O_3$) and titanium oxide ($TiO_2$), have been proposed as the tunneling barrier material, the most promising material to date is magnesium oxide (MgO). Most fabrication processes for the insulating layer in MTJ devices involve reactively sputtering using an inert gas, such as xenon or argon, together with a reactive gas (i.e., oxygen) to form the metallic oxide.

The insulating layer generally can affect the bandgap of the device. The bandgap is the minimum energy that is needed to excite an electron up to a state in the conduction band where it can participate in conduction. In magnetic storage devices, the bandgap should be as low as possible. The bandgap can be reduced by reducing the thickness of the insulating layer. However reducing the barrier thickness increases the instability of the device and reduces its performance characteristics.

Therefore, there is a need for a new barrier material in magnetic storage devices that can reduce bandgap.

SUMMARY OF THE DISCLOSURE

Nitrogen doping an insulating layer can lower the bandgap of a magnetic storage device. It is challenging to nitrogen dope magnesium oxide (MgO). A cation can be added to allow the magnesium to hold onto the nitrogen dopant without highly oxidizing or nitriding the cation. The resulting nitrogen doped MgXO, where X is the cation, has a lower bandgap compared to a much similar barrier layer that has neither nitrogen nor a cation thus improving thermal and electrical reliabilities. The nitrogen doped MgXO is non-stoichiometric whereas comparably, an oxynitride is stoichiometric. Example cations that may be used include aluminum, titanium, vanadium, chromium, and scandium.

In one embodiment, a magnetic recording head comprises: a first shield; a second shield; and a non-stoichiometric, nitrogen-doped MgXO layer disposed between the first shield and the second shield, where X is a cation.

In another embodiment, a spin orbit torque (SOT) device comprises: a spin orbit torque (SOT) layer; a ferromagnetic layer; and a first nitrogen doped MgXO layer disposed between the SOT layer and the ferromagnetic layer, wherein X is a cation.

In another embodiment, a device comprises: a non-stoichiometric nitrogen doped MgXO layer, wherein X is a cation; a first ferromagnetic layer disposed on the non-stoichiometric nitrogen doped MgXO layer; and a cap layer disposed on the first ferromagnetic layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

It has been shown that nitrogen doping into an insulating layer can lower the bandgap. It is challenging to nitrogen dope magnesium oxide (MgO). A cation can be added to allow the magnesium to hold onto the nitrogen dopant without highly oxidizing or nitriding the cation. The resulting nitrogen doped MgXO, where X is the cation, has a lower bandgap compared to a much similar barrier layer that has neither nitrogen nor a cation thus improving thermal and electrical reliabilities. The nitrogen doped MgXO is non-stoichiometric whereas comparably, an oxynitride is stoichiometric. Example cations that may be used include aluminum, titanium, vanadium, chromium, and scandium.

Figure 1:
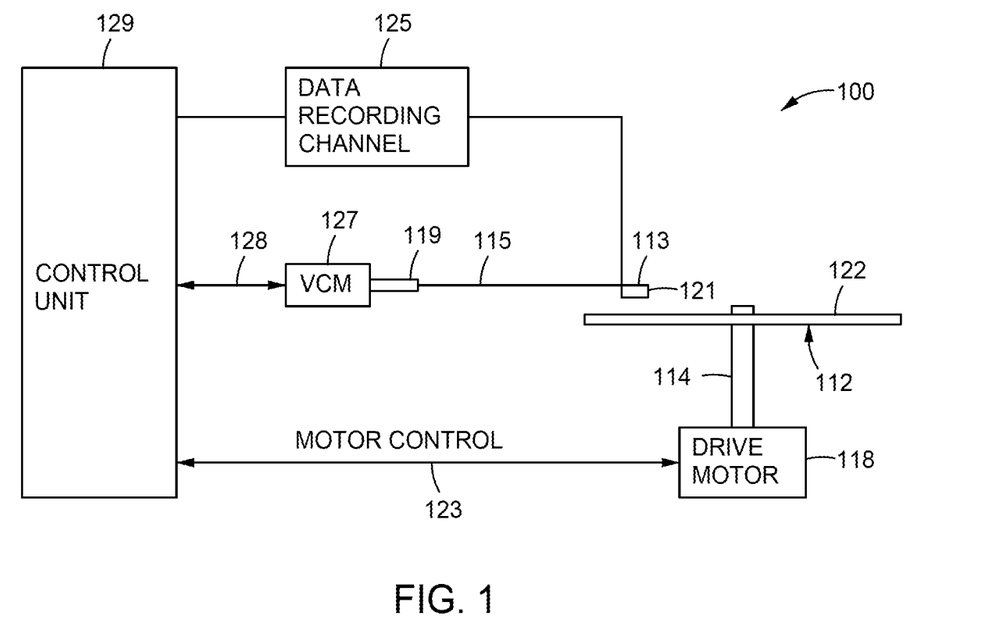
FIG. 1 is a schematic illustration of certain embodiments of a magnetic media drive.

FIG. 1 is a schematic illustration of certain embodiments of a magnetic media drive 100. Such a magnetic media drive 100 may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

Figure 2:
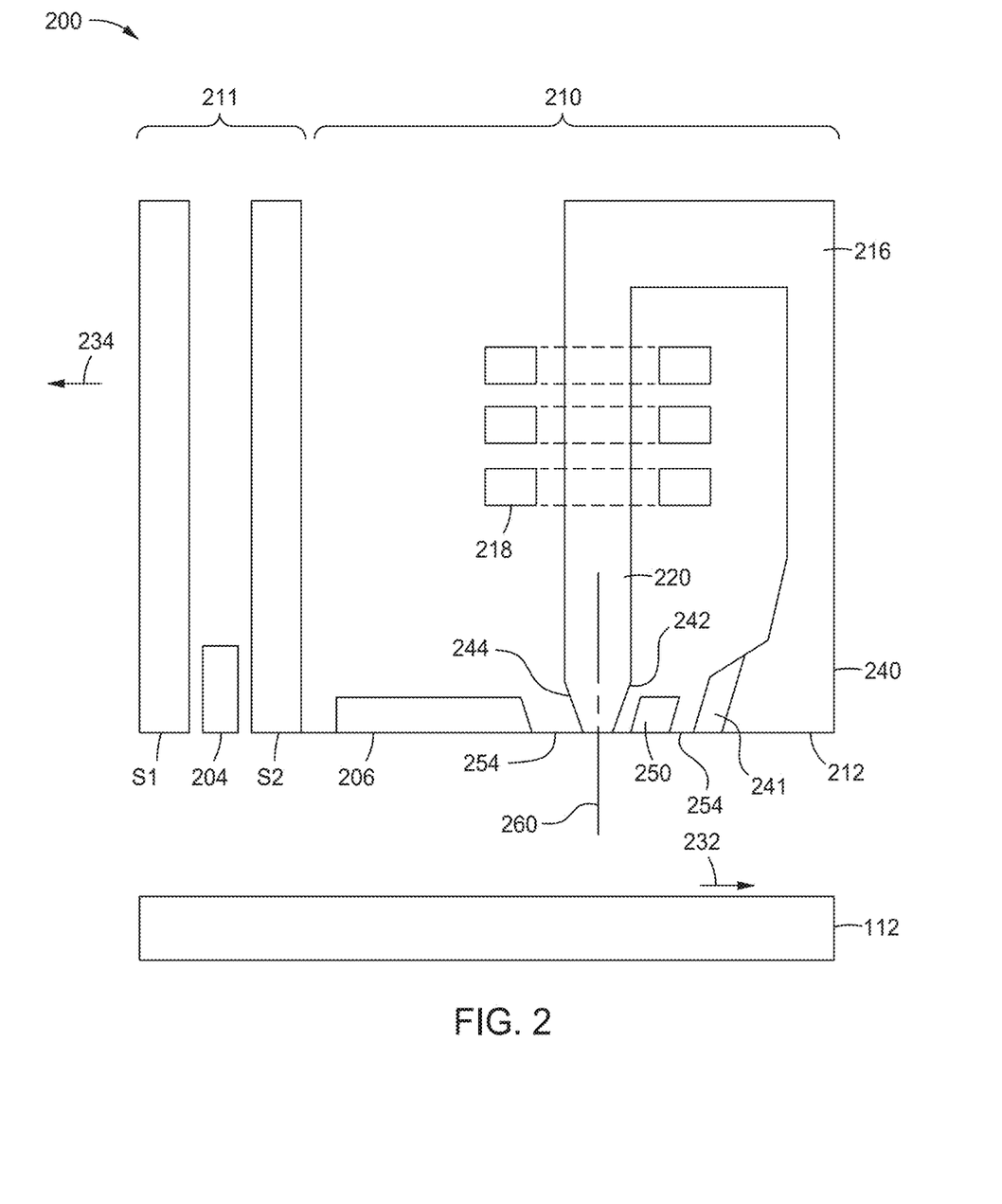
FIG. 2 is a fragmented, cross-sectional side view of certain embodiments of a read/write head.

FIG. 2 is a fragmented, cross-sectional side view of certain embodiments of a read/write head 200. The read/write head 200 faces a magnetic media 112. The read/write head 200 may correspond to the magnetic head assembly 121 described in FIG. 1. The read/write head 200 includes a media facing surface (MFS) 212, such as a gas bearing surface or air bearing surface (ABS), facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

The write head 210 includes a main pole 220, a leading shield 206, a trailing shield 240, an optional enhancement device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) effect, the enhancement device 250 in the form of a spin torque oscillator is formed in a gap 254 between the main pole 220 and the trailing shield 240. The enhancement device 250 may also be in the form of a material stack comprising one or more conductive, magnetic and/or non-magnetic materials to provide assistive writing effect. In other embodiments, to provide a Heat Assisted Magnetic Recording (HAMR) effect, a near field transductor (NFT) coupled to an external optical source may be provided near the main pole, to provide localized heating on the magnetic recording media 112 to lower its coercivity for the assistive writing effect.

The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot buffer layer 241. The trailing shield hot buffer layer 241 can include a high moment sputter material, such as CoFeN, FeXN, or FeX, where X includes at least one of N, Al, Ni, Co, Ta, Re, Ir, Pt, Rh, Ta, Zr, and Ti. In certain embodiments, the trailing shield 240 does not include a trailing shield hot buffer layer.

In some embodiments, the magnetic read head 211 is a magnetoresistive (MR) read head that includes an MR sensing element 204 located between shields S1 and S2. In other embodiments, the magnetic read head 211 is a magnetic tunnel junction (MTJ) read head that includes a MTJ sensing device 204 located between shields S1 and S2. The magnetic fields of the adjacent magnetized regions in the magnetic disk 112 are detectable by the MR (or MTJ) sensing element 204 as the recorded bits. The MTJ construct may include two magnetic layers separated by a barrier layer. The barrier layer typically comprises MgO, and has an important effect on the overall performance of the MTJ and overall sensor and read head. In other embodiments, the magnetic read head 211 includes, between the two shields S1 and S2, a material stack for providing sensing based on the spin orbit torque (SOT) effect. MgO may also be used within the layers for such a SOT material stack.

Typically, increasing the barrier layer's thickness has led to a higher resistance area (RA) product of the barrier layer, which decreases the signal to noise ratio (SNR) of the overall MTJ or sensor stack. As will be discussed herein, a nitrogen doped MgXO layer as a barrier layer lowers the bandgap compared to a conventional MgO barrier layer. The nitrogen doped MgXO layer enables a much thicker TMR barrier at the same resistance area (RA) product, thus improving thermal and electrical reliabilities of the barrier layer. In particular, the increased barrier layer thickness from this approach provides for increased migration resistance, while still maintaining a small RA. A small RA is beneficial for a better signal to noise ratio (SNR) of the overall MTJ or sensor stack. Additionally, the barrier grain size is maintained or enhanced for epitaxial stacks as nitrogen doping can decrease grain size. It is noted that while the barrier layer properties are discussed in the context of a magnetic recording read head, an MTJ has various other applications outside of a read head in a magnetic recording device, such as in magnetoresistive random access memory (MRAM) and sensor and/or logic applications. Thus, this disclosure is not limited to read head only.

Figure 3A:
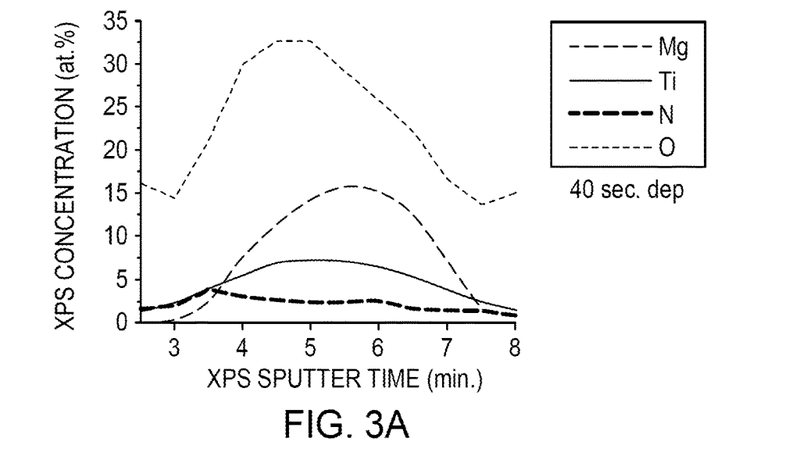
FIGS. 3A-3C are a series of graphs showing nitrogen content with different deposition time for nitrogen doped MgTiO.
Figure 3B:
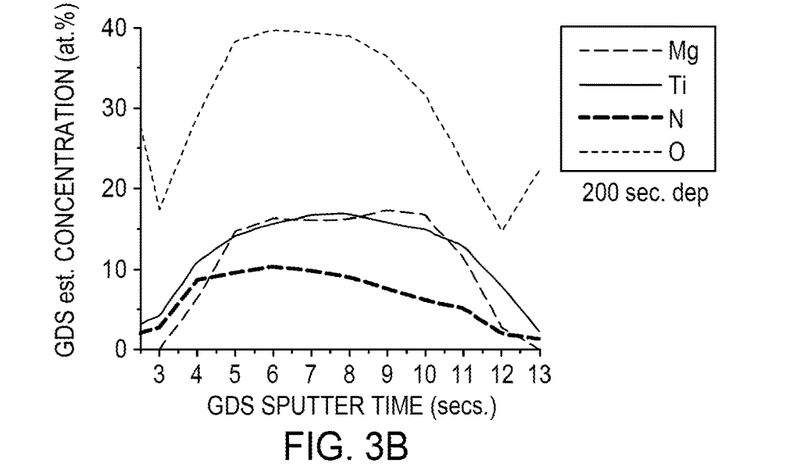
Figure 3C:
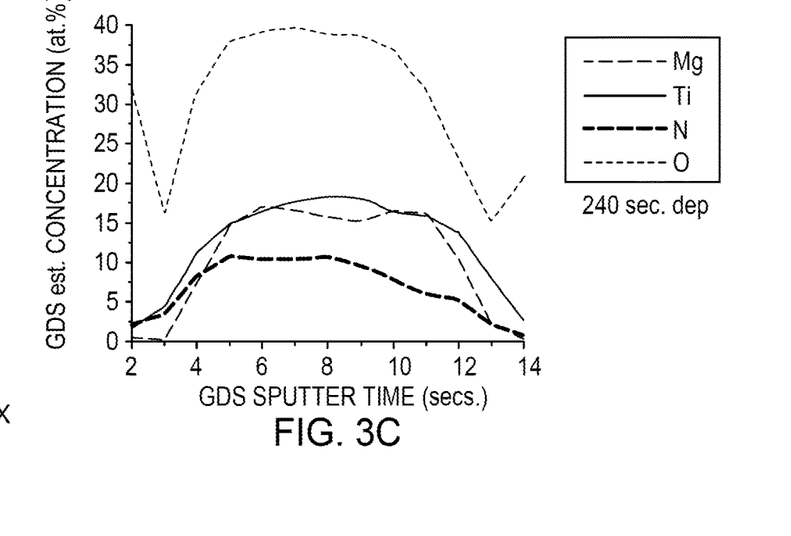

FIGS. 3A-3C are a series of graphs showing that with a total deposition time, the nitrogen content increased which indicating N-doping incorporation into MgTiO. In FIG. 3A, the Y axis indicates the estimated concentration of Mg, Ti, N, and O in atomic percentage from XPS technique while the X axis is the XPS sputter time in minutes for a 40 second deposition process. In FIG. 3B, the Y axis indicates the estimated concentration of Mg, Ti, N, and O in atomic percentage from GDS technique while the X axis is the GDS sputter time in seconds for a 200 second deposition process. In FIG. 3C, the Y axis indicates the GDS estimated concentration of Mg, Ti, N, and O in atomic percentage while the X axis indicates the GDS sputter time in seconds for a 240 second deposition process. In each case of FIGS. 3A-3C, the increase in sputter time shows an increase in nitrogen content roughly correlating to an increase in each of Mg, Ti, and O. Thus, FIGS. 3A-3C show nitrogen doping is occurring in MgTiO and doping amount increases with thickness (deposition time).

Table I below illustrates the impact of nitrogen on RA and, in particular, shows that with an increasing thickness, the comparable RA ratio of nitrogen doped MgTiO's RA (identified as N—MgTiO in the Table I) to undoped MgTiO's RA decreases (see 5th column from left and 8th column from left below). The RA is measured on a TMR stack where the barrier is sandwiched between the CoFe free layer and the reference or pinned CoFe layer which is exchanged biased by an AFM. The RA product is measured on this TMR stack using a Current In Plane technique (CIPT). For the individual RA's for undoped MgTiO and nitrogen doped MgTiO, the respective RA of each increases with increased thickness, but at a much lower rate for the nitrogen doped MgTiO ($3^{rd}$ and $6^{th}$ columns) as compared to the undoped MgTiO ($4^{th}$ and $7^{th}$ columns). Furthermore, annealing, while increasing RA, increases RA for MgTiO much more than nitrogen doped MgTiO. Table I also shows the XPS nitrogen concentration for the films.

Figure 4A:
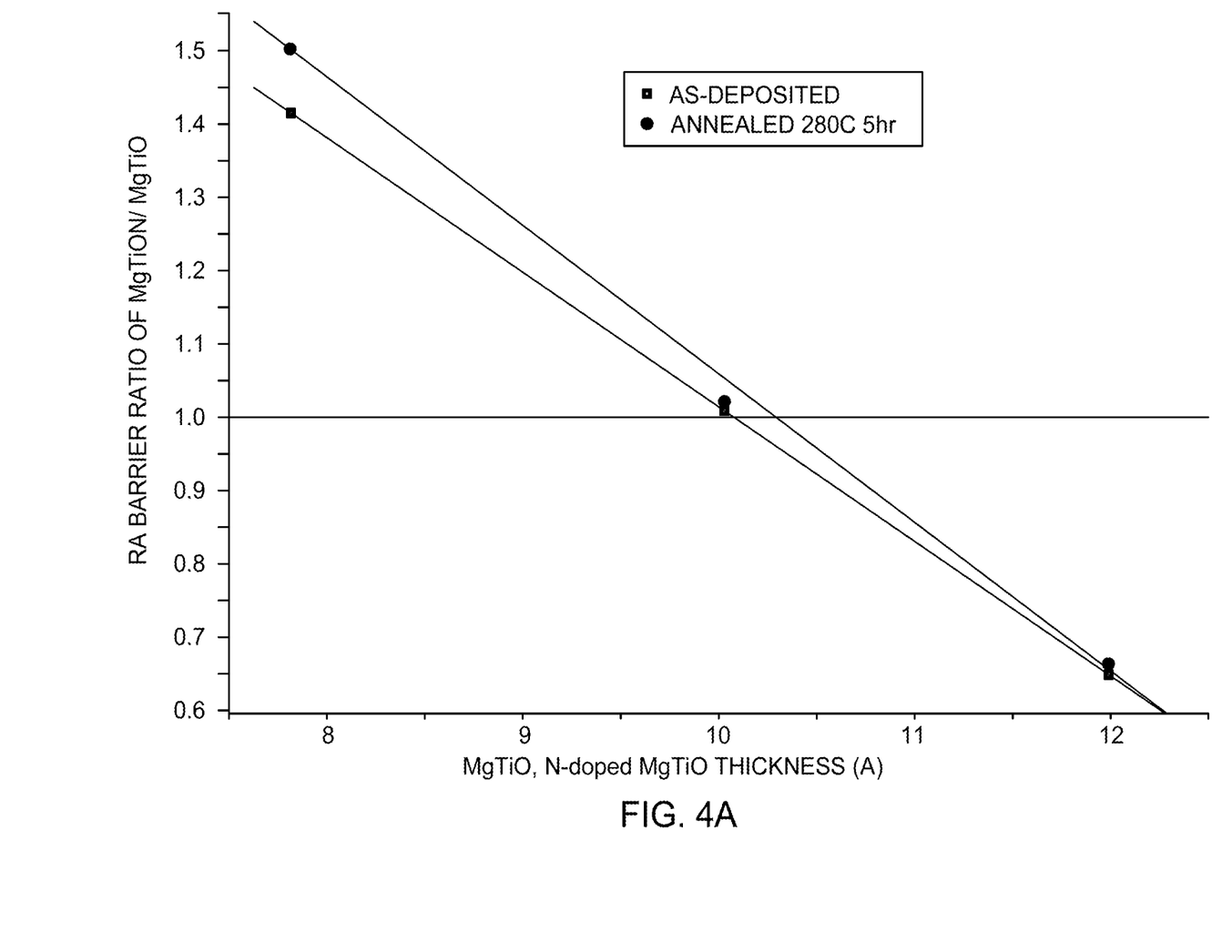
FIGS. 4A and 4B illustrate effective RA ratio between nitrogen doped MgTiO to without nitrogen doping and the change in nitrogen content with thickness.
Figure 4B:
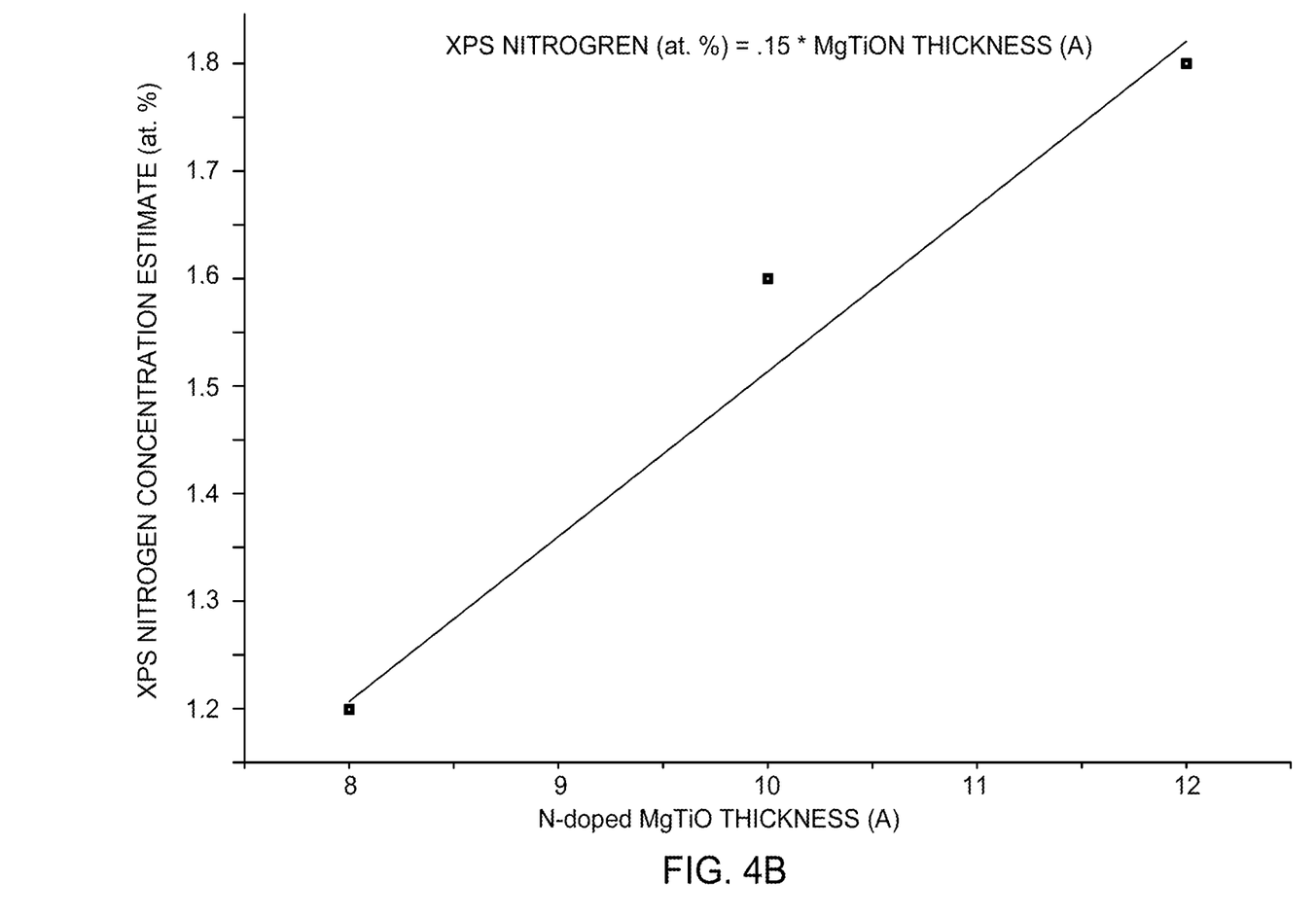

FIG. 4A plots the 5th and 8th columns of the data of Table I relative to the $1^{st}$ column, showing the decrease in RA ratio of nitrogen doped MgTiO's RA to undoped MgTiO's RA (Y-axis), against with an increase in thickness (X-axis). The RA ratio is declining significantly for thicker films indicating that the bandgap is reducing with nitrogen content increase. The horizontal line at 1.0 is to indicate that for the particular nitrogen flow exemplified in FIG. 4A, the minimum thickness is roughly about 10 Angstroms beyond which bandgap of N2 doped MgTiO is smaller than that of without N2 doping. Depending upon the deposition conditions such as nitrogen flow, the thickness threshold for ratio below 1.0 may change. Higher Nitrogen deposition conditions are expected to decrease this threshold thickness while lower nitrogen depositions should increase it. FIG. 4B shows the XPS Nitrogen concentration as a function of thickness. The vertical scale of FIG. 4B is the averaged XPS Nitrogen concentration measured in the actual CIPT-RA wafer stack shown in Table I, while the horizontal axis is the thickness in Angstroms of the nitrogen doped MgTiO layer. It is clear that XPS nitrogen content (atomic percentage) linearly increases with thickness of the nitrogen doped MgTiO thickness. The sensitivity (slope) will depend on deposition conditions. Thus, Table I, together with FIGS. 3A-3C and 4A-4B collectively show that a nitrogen doped MgXO (N—MgTiO in Table I) layer lowers bandgap. Lowering the bandgap allows for the device to operate at a lower voltage and with thicker barrier thickness. The nitrogen doped MgXO layer is different than MgXON. Stated another way, a nitrogen doped magnesium cation oxide is different from a magnesium cation oxynitride. The oxynitride is stoichiometric whereas the nitrogen doped oxide is non-stoichiometric. The embodiments disclosed herein are nitrogen doped oxides, not oxynitrides. Stated another way, the embodiments disclosed herein are directed to non-stoichiometric nitrogen doped MgXO and not to stoichiometric oxynitrides (e.g., MgXON).

Figures 5, 6:
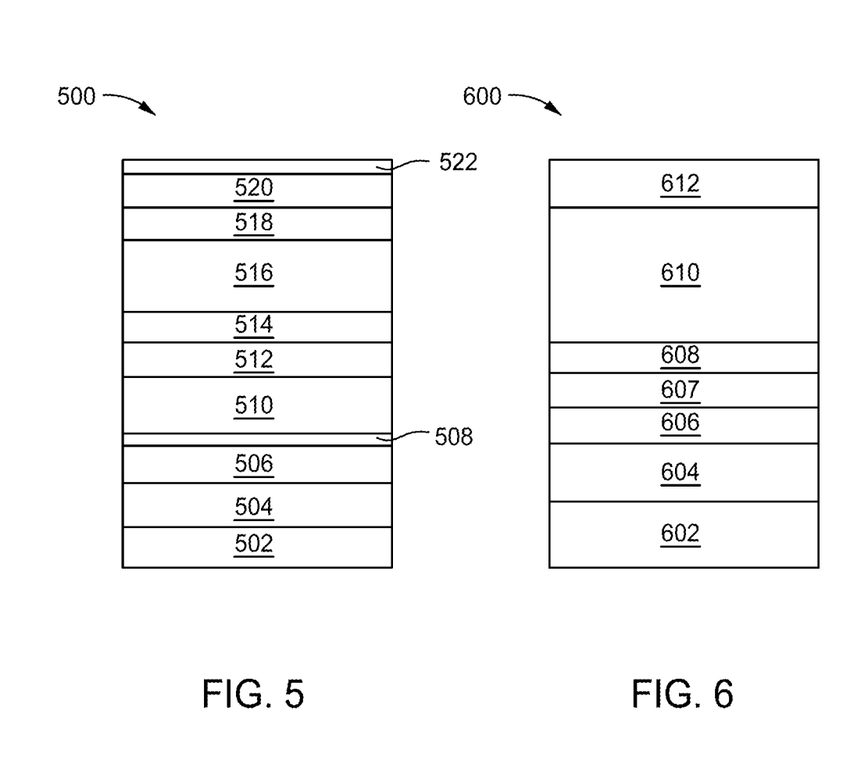
FIG. 5 is a schematic illustration of an SOT stack according to one embodiment.
FIG. 6 is schematic illustration of a sensor according to one embodiment.

FIG. 5 is a schematic illustration of an SOT stack according to some embodiments. The SOT stack can be fabricated with a SOT layer (e.g., a BiSb layer having a (012) orientation) that has a large spin Hall angle effect and high electrical conductivity. Such a layer can be used with a ferromagnetic free layer to form a spin-orbit torque (SOT) based magnetic tunnel junction (MTJ) device. Various embodiments include, for example, a spin-orbit torque device in a magnetic recording head, e.g., as part of a read head, and/or a microwave assisted magnetic recording (MAMR) write head. In another example, the SOT stack can be used in a magnetoresistive random access memory (MRAM) device. The SOT MTJ device can be in a perpendicular stack configuration or an in-plane stack configuration.

TABLE I

| | | RA Comparison | | | | | |
|---|---|---|---|---|---|---|---|
| | XPS | As-deposited | | | Annealed | | |
| Thickness (Angstroms) | Nitrogen Concentration (at. %) | RA N—MgTiO | RA MgTiO | RA ratio N—MgTiO/ MgTiO | RA N—MgTiO | RA MgTiO | RA ratio N—MgTiO/ MgTiO |
| 8 | 1.2 | 0.547 | 0.395 | 1.385 | 0.611 | 0.412 | 1.483 |
| 10 | 1.6 | 0.93 | 0.915 | 1.016 | 1.171 | 1.1138 | 1.029 |
| 12 | 1.8 | 1.528 | 2.32 | 0.659 | 2.265 | 3.29 | 0.688 |

In one embodiment, the SOT stack may be part of a magnetic recording head, such as a read head 211 or a write head 210 in FIG. 2. In other embodiments, the SOT stack may be part of a magneto-resistive random access memory (MRAM) cell, a magnetic sensor, a SOT-based logic element useable for AI applications. The various end application embodiments are further described in co-owned U.S. Pat. No. 11,763,973 B2, titled "Buffer layers and interlayers that promote BiSbX (012) alloy orientation for SOT and MRAM devices," the disclosure of which are incorporated by reference. In this disclosure however, the SOT layer is not limited to BiSbX (012) alloy and can be fabricated with other material options and orientations.

Generally speaking, the SOT stack 500 comprises the functional layers of a SOT layer 516 and a ferromagnetic layer 510, separated by various layers including an interlayer 514 and a nitrogen doped MgXO layer 512. Depending on the end application (e.g., top or bottom), the placement of the SOT layer 516 and ferromagnetic layer 510 can be reversed. Also, additional layers may be added to the overall stack depending on applications, as disclosed in the above referenced co-owned '973 patent.

FIG. 5 provides an example stack configuration. The SOT stack 500 includes a first non-magnetic, electrically conductive layer 502. In the embodiment where the SOT stack 500 is used in a magnetic recording head and is disposed between the main pole and a shield, e.g., as the enhancement element 250 in FIG. 2, the electrically conductive layer 502 could be disposed on the main pole. In other embodiments, the electrically conductive layer 502 may be an electrical contact (electrode), or disposed on an electrical contact. Suitable materials for the first non-magnetic, electrically conductive layer 502 include lower resistivity nonmagnetic metallic layers like Ta, Ru, or higher resistivity nanocrystalline nonmagnetic layers like alloys like NiFeX, CoFeX where X=W, Ta, or Hf. A seed layer 504 is disposed on the first non-magnetic, electrically conductive layer 502. Suitable materials for the seed layer 504 include texturing layers like RuAl for epitaxial stacks as well as standard AFM to provide AP coupling to FM 510 layer. A first nitrogen doped MgXO layer 506 is disposed on the seed layer 504. The first nitrogen doped MgXO layer 506 is a non-stoichiometric layer. A second non-magnetic, electrically conductive layer 508 is disposed on the first nitrogen doped MgXO layer 506. Suitable materials for the second non-magnetic, electrically conductive layer 508 include ruthenium. A ferromagnetic layer 510 is disposed on the second non-magnetic, electrically conductive layer 508. Suitable materials for the ferromagnetic layer 510 include NiFe, CoFe, NiFeX, CoFeX, FeX, or NiX, where X=Cr, Co, Ni, Cu, Si, Ge, Al, Ti, V, Mn, Zr, Nb, Mo, Rh, W, Ta, Hf, Re, Ir, Pt, and C, N, B, and combinations thereof.

A second nitrogen doped MgXO layer 512 is disposed on the first ferromagnetic layer 510. The second nitrogen doped MgXO layer 512 is a non-stoichiometric layer. The second nitrogen doped MgXO layer 512 is substantially the same as the first nitrogen doped MgXO layer 506. A first interlayer 514 is disposed on the second nitrogen doped MgXO layer 512. Suitable materials for the first interlayer layer 514 include amorphous/nanocrystalline nonmagnetic materials comprising NiFe, CoFe, NiFeX, CoFeX, FeX, NiX, or CuX where X=Cr, Co, Ni, Cu, Si, Al, Mn, Si, Ge, Zr, Nb, Mo, Ta, Hf, W, Ir, N, and B, and combination thereof.

A SOT layer 516 is disposed on the interlayer 514. Suitable materials for the SOT layer 516 include undoped BiSb or doped BiSbX, where the dopant is less than about 10%, and where X is extracted from elements which don't readily interact with either Bi or Sb, such as Cu, Ag, Si, Ge, Mn, Ni, Co Mo, Sn, C, B, N, In, Te, Se, Y, Zr, Nb, Mo, Ta, W, Pt, Ir, Ti, or in alloy combinations with one or more of aforementioned elements, like CuAg, CuNi, CoCu, AgSn. Other suitable SOT materials may include YBiPt and [other SOT material options such as topological insulator or heavy metal materials having suitable spin orbit torque properties such as BiSe, WTe, CdTe, Pt, Ta, W, beta-tungsten, beta tantalum, YBiPtX, where X is as listed above, and combinations thereof].

A second interlayer 518 is disposed on the SOT layer 516, and comprises materials similar to the interlayer 514. A third nitrogen doped MgXO layer 520 is disposed on the second interlayer 518. The third nitrogen doped MgXO layer 520 is a non-stoichiometric layer. The third nitrogen doped MgXO layer 520 is substantially the same as the first nitrogen doped MgXO layer 506 and the second nitrogen doped MgXO layer 512. A conductive cap layer 522 is disposed on the third nitrogen doped MgXO layer 520. The cap layer 522 may comprise nonmagnetic, high resistivity materials, such as: thin ceramic oxides or nitrides of TiN, SiN, MgTiO, and MgO; amorphous/nanocrystalline metals such as NiFeGe, NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WReN, TaN, WN, TaOx, WOx, WB, HfB, NiHfB, NiFeHfB, CoHfB, and CoFeHfB, where x is a numeral.

In various embodiments, the first and third nitrogen doped MgXO layers 506 and 520 may be optional. The second MgXO nitrogen doped MgXO layer 512, being between the SOT layer 516 and the ferromagnetic layer 510, reduces shunting which enhances the overall functional effectiveness in the interaction between the two layers, due to the aforementioned bandgap reduction property of the MgXO layer. The first nitrogen doped MgXO layer 506 can be used to also reduce shunting and the third nitrogen doped MgXO layer 512 can function as a cap layer. It is important to note that when there is more than one nitrogen doped MgXO layer in a structure, the nitrogen doped MgXO layers are substantially identical. While there may be slight differences due to trace impurities (i.e., less than 0.5 atomic percent in total), the composition of the nitrogen doped MgXO layers are identical. The word 'substantially' is intended to permit impurities that would not alter the function of the nitrogen doped MgXO layers. Impurities of greater than 0.5 atomic percent would be considered outside the range of being 'substantially' the same. The nitrogen doped MgXO layers function as diffusion barrier layers.

FIG. 6 is schematic illustration of a sensor 600 according to one embodiment. The sensor 600 is a TMR sensor. The sensor 600 includes a first non-magnetic, electrically conductive layer 602 that will be disposed on S1. Suitable materials for the first non-magnetic, electrically conductive layer 602 include Ta, Ru, NiFeTa, NiCr, CoHf, NiAl, and RuAl. A seed layer 604 is disposed on the first non-magnetic, electrically conductive layer 602. Suitable materials for the seed layer 604 include NiAl and RuAl. An antiferromagnetic (AFM) layer 606 is disposed on the seed layer 604. Suitable materials for the AFM layer 606 include IrMn. A ferromagnetic layer 607 is disposed on the AFM layer 606. Suitable materials for the ferromagnetic layer 607 include NiFe, CoFe, NiFeX, CoFeX, FeX, or Nix, where X=Cr, Co, Ni, Cu, Si, Ge, Al, Ti, V, Mn, Zr, Nb, Mo, Rh, W, Ta, Hf, Re, Ir, Pt, and C, N, B, and combinations thereof.

A nitrogen doped MgXO layer 608 disposed on the ferromagnetic layer 607. The nitrogen doped MgXO layer 608 is a non-stoichiometric layer. A ferromagnetic layer 610 is disposed on the nitrogen doped MgXO layer 608. Suitable materials for the ferromagnetic layer 610 include NiFe, CoFe, NiFeX, CoFeX, FeX, or NiX, where X=Cr, Co, Ni, Cu, Si, Ge, Al, Ti, V, Mn, Zr, Nb, Mo, Rh, W, Ta, Hf, Re, Ir, Pt, and C, N, B, and combinations thereof. In some embodiments, the ferromagnetic layer 610 is a free layer, whose direction of magnetization is responsive to an external field to be sensed and the ferromagnetic layer 607 is a pinned layer whose direction of magnetization is fixed. A cap layer 612 is disposed on the ferromagnetic layer 610. The cap layer 612 may comprise nonmagnetic, high resistivity materials, such as: thin ceramic oxides or nitrides of TiN, SiN, MgTiO, and MgO; amorphous/nanocrystalline metals such as NiFeGe, NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WReN, TaN, WN, TaOx, WOx, WB, HfB, NiHfB, NiFeHfB, CoHfB, and CoFeHfB, where x is a numeral. S2 will be disposed on the cap layer 612.

Figure 7:
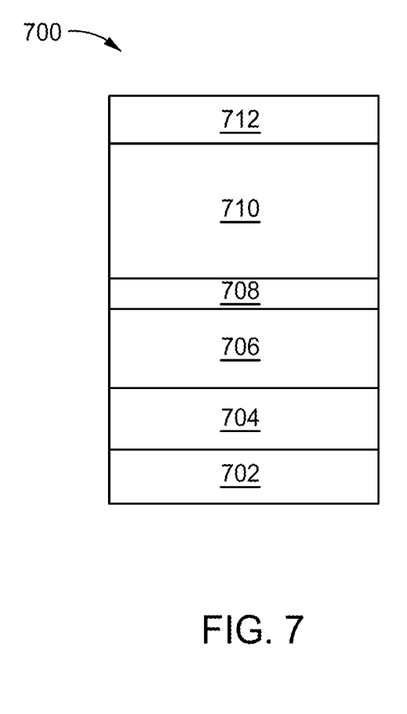
FIG. 7 is a schematic illustration of a sensor according to another embodiment.

FIG. 7 is a schematic illustration of a sensor 700 according to another embodiment. The sensor 700 is a dual free layer (DFL) sensor. The sensor 700 includes a first non-magnetic, electrically conductive layer 702 that will be disposed on S1. Suitable materials for the first non-magnetic, electrically conductive layer 702 include Ta, Ru, NiFeTa, NiFeGe, NiGe, NiCr, CoHf, NiAl, and RuAl. A seed layer 704 is disposed on the first non-magnetic, electrically conductive layer 702. Suitable materials for the seed layer 704 include NiAl and RuAl. A first ferromagnetic layer 706 is disposed on the seed layer 704. Suitable materials for the first ferromagnetic layer 706 include NiFe, CoFe, NiFeX, CoFeX, FeX, or NiX, where X=Cr, Co, Ni, Cu, Si, Ge, Al, Ti, V, Mn, Zr, Nb, Mo, Rh, W, Ta, Hf, Re, Ir, Pt, and C, N, B, and combinations thereof.

A nitrogen doped MgXO layer 708 disposed on the first ferromagnetic layer 706. The nitrogen doped MgXO layer 708 is a non-stoichiometric layer. A second ferromagnetic layer 710 is disposed on the nitrogen doped MgXO layer 708. Suitable materials for the second ferromagnetic layer 710 include NiFe, CoFe, NiFeX, CoFeX, FeX, or NiX, where X=Cr, Co, Ni, Cu, Si, Ge, Al, Ti, V, Mn, Zr, Nb, Mo, Rh, W, Ta, Hf, Re, Ir, Pt, and C, N, B, and combinations thereof. In some embodiments, the first and second ferromagnetic layers 706 and 710 are both free layers, and they form the dual free layers in the DFL sensor. A cap layer 712 is disposed on the second ferromagnetic layer 710. The cap layer 712 may comprise nonmagnetic, high resistivity materials, such as: thin ceramic oxides or nitrides of TiN, SiN, MgTiO, and MgO; amorphous/nanocrystalline metals such as NiFeGe, NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WREN, TaN, WN, TaOx, WOx, WB, HfB, NiHfB, NiFeHfB, CoHfB, and CoFeHfB, where x is a numeral. S2 will be disposed on cap layer 712.

It is noted that the TMR and DFL sensor stacks in FIGS. 6-7 are not limited to sensor applications or in magnetic recording applications. In other embodiments, such stacks or portions thereof may be part of an MRAM memory cell comprising a magnetic tunnel junction (MTJ) or a stand-alone sensor outside of a magnetic recording device. More generally, the nitrogen doped MgXO layer as disclosed can serve as the barrier layer of any application of an MTJ. For example, it can serve as a barrier layer separating two ferromagnetic layers which may serve as either a pinned or free layer, such as in a configuration used in a MRAM cell. In addition, the shields S1 and S2 disclosed in FIGS. 6 and 7 are optional, e.g., when the sensors are for stand-alone sensor applications and not within a magnetic recording head.

By using a non-stoichiometric nitrogen doped MgXO layer in various device stacks for magnetic recording, memory, logic and other applications, the bandgap can be lowered with small RA while maintaining thicker barrier thickness/good reliability.

In one embodiment, a magnetic recording head comprises: a first shield; a second shield; and a non-stoichiometric, nitrogen-doped MgXO layer disposed between the first shield and the second shield, where X is a cation. The nitrogen is present in an amount of below 10 atomic percent. The nitrogen is present in an amount of below 5 atomic percent. X is selected from the group consisting of Al, Sc, Ti, V, Cr, Zn, Zr, Nb, Mo, Ta, Hf, W, and combinations thereof. The nitrogen-doped MgXO layer is disposed within a spin orbit torque structure. The first shield is a leading shield, wherein the second shield is a trailing shield, wherein the head further comprises a main pole, and wherein the spin orbit torque structure is disposed between the main pole and the trailing shield. The nitrogen-doped MgXO layer is a first nitrogen-doped MgXO layer, wherein the head further comprises a second nitrogen-doped MgXO layer, and wherein the first nitrogen-doped MgXO layer and the second nitrogen-doped MgXO layer are substantially identical. The head further comprises: a first free layer; and a second free layer, wherein the nitrogen-doped MgXO layer is disposed between the first free layer and the second free layer. The head further comprises: an antiferromagnetic (AFM) layer; a FM layer and a free layer, wherein the nitrogen-doped MgXO layer is disposed between the AFM layer and the free layer. A magnetic storage device comprising the head is also contemplated.

In another embodiment, a spin orbit torque (SOT) device comprises: a spin orbit torque (SOT) layer; a ferromagnetic layer; and a first nitrogen doped MgXO layer disposed between the SOT layer and the ferromagnetic layer, wherein X is a cation. The SOT device further comprises an interlayer between the SOT layer and the ferromagnetic layer. X is selected from the group consisting of Al, Sc, Ti, V, Cr, Zn, Zr, Nb, Mo, Ta, Hf, W, and combinations thereof. The SOT device further comprises a second nitrogen doped MgXO layer that is disposed between the ferromagnetic layer and an electrode or a shield, or between the SOT layer and an electrode or a shield. A magnetic storage device comprising the SOT device is also contemplated. A magnetoresistive random access memory (MRAM) device comprising the SOT device is also contemplated.

In another embodiment, a device comprises: a non-stoichiometric nitrogen doped MgXO layer, wherein X is a cation; a first ferromagnetic layer disposed on the non-stoichiometric nitrogen doped MgXO layer; and a cap layer disposed on the second ferromagnetic layer. The device further comprises an antiferromagnetic (AFM) layer, a first ferromagnetic layer wherein the non-stoichiometric nitrogen doped MgXO layer is disposed between the first ferromagnetic layer and the second ferromagnetic layer. The device further comprises second ferromagnetic layer, wherein the non-stoichiometric nitrogen doped MgXO layer is disposed between the second ferromagnetic layer and the first ferromagnetic layer. A head for a magnetic storage device comprising the device is also contemplated. A magnetic storage device comprising the head is also contemplated. A magnetoresistive random access memory (MRAM) device comprising the device is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a first shield;
a second shield; and
a non-stoichiometric, nitrogen-doped MgXO layer disposed between the first shield and the second shield, where X is a cation, wherein the nitrogen-doped MgXO layer is disposed within a spin orbit torque structure, the spin orbit torque structure comprising:
a spin orbit torque (SOT) layer; and
a ferromagnetic layer; wherein the nitrogen-doped MgXO layer is disposed between the SOT layer and the ferromagnetic layer.

2. The head of claim 1, wherein the nitrogen is present in an amount of below 10 atomic percent.

3. The head of claim 2, wherein the nitrogen is present in an amount of below 5 atomic percent.

4. The head of claim 1, wherein X is selected from the group consisting of Al, Sc, Ti, V, Cr, Zn, Zr, Nb, Mo, Ta, Hf, W, and combinations thereof.

5. The head of claim 1, wherein the first shield is a leading shield, wherein the second shield is a trailing shield, wherein the head further comprises a main pole, and wherein the spin orbit torque structure is disposed between the main pole and the trailing shield or the leading shield.

6. The head of claim 1, wherein the nitrogen-doped MgXO layer is a first nitrogen-doped MgXO layer, wherein the head further comprises a second nitrogen-doped MgXO layer, and wherein the first nitrogen-doped MgXO layer and the second nitrogen-doped MgXO layer are substantially identical.

7. A magnetic storage device comprising the head of claim 1.

8. A spin orbit torque (SOT) device, comprising:
a spin orbit torque (SOT) layer;
a ferromagnetic layer;
a non-stoichiometric first nitrogen-doped MgXO layer disposed between the SOT layer and the ferromagnetic layer, wherein X is a cation; and
a second nitrogen-doped MgXO layer that is disposed between the ferromagnetic layer and an electrode or a shield, or between the SOT layer and an electrode or a shield.

9. The SOT device of claim 8, further comprises an interlayer between the SOT layer and the ferromagnetic layer.

10. The SOT device of claim 8, wherein X is selected from the group consisting of Al, Sc, Ti, V, Cr, Zn, Zr, Nb, Hf, W, and combinations thereof.

11. A magnetic storage device comprising the SOT device of claim 8.

12. A magnetoresistive random access memory (MRAM) device comprising the SOT device of claim 8.

13. The SOT device of claim 8, wherein the nitrogen is present in an amount of below 10 atomic percent.

14. A spin orbit torque (SOT) device, comprising:
a first electrode or shield;
a second electrode or shield;
a spin orbit torque (SOT) layer disposed between the first electrode or shield and the second electrode or shield;
a ferromagnetic layer disposed between the first electrode or shield and the second electrode or shield;
a first non-stoichiometric first nitrogen-doped MgXO layer disposed between the first electrode or shield and the second electrode or shield, wherein X is a cation, wherein the first non-stoichiometric first nitrogen-doped MgXO layer is spaced from the SOT layer; and
a second nitrogen-doped MgXO layer that is disposed between the first electrode or shield and the second electrode or shield, wherein the second nitrogen-doped MgXO layer is spaced from the SOT layer, the ferromagnetic layer, and the first non-stoichiometric first nitrogen-doped MgXO layer.

15. The SOT device of claim 14, wherein the first non-stoichiometric first nitrogen-doped MgXO layer is disposed between the SOT layer and the ferromagnetic layer.

16. The SOT device of claim 14, wherein X is selected from the group consisting of Al, Sc, Ti, V, Cr, Zn, Zr, Nb, Hf, W, and combinations thereof.

17. The SOT device of claim 14, wherein the nitrogen is present in an amount of below 10 atomic percent.

18. The SOT device of claim 14, wherein the nitrogen is present in an amount of below 5 atomic percent.

19. A magnetic storage device comprising the SOT device of claim 14.

* * * * *